United States Patent [19]  
Weinberg et al.

[11] 4,424,140  
[45] Jan. 3, 1984

[54] STABILIZATION OF POLYCONDENSATION CATALYSTS

[75] Inventors: Kurt Weinberg, Upper Saddle River, N.J.; Gordon C. Johnson, Armonk, N.Y.

[73] Assignee: Union Carbide Corporation, Danbury, Conn.

[21] Appl. No.: 384,502

[22] Filed: Jun. 3, 1982

[51] Int. Cl.$^3$ .............................................. C08F 4/16
[52] U.S. Cl. ................................. 502/155; 528/279; 528/283; 502/158; 502/169; 502/170
[58] Field of Search ........... 252/429 R, 431 C, 431 N, 252/431 P; 528/279, 283

[56] References Cited
U.S. PATENT DOCUMENTS

Re. 30,554  3/1981  Weinberg et al. .......... 252/431 P X
4,101,526  7/1978  Buxbaum ........................ 528/279 X
4,115,371  9/1978  Bier et al. ............................ 528/279
4,143,057  3/1979  Weinberg et al. .......... 252/431 P X
4,361,694  11/1982  Weinberg et al. .................. 528/279

*Primary Examiner*—Patrick Garvin
*Attorney, Agent, or Firm*—Norman L. Balmer

[57] ABSTRACT

The process for the stabilization of polycondensation catalysts and the stabilization composition used in such process for producing polyesters and copolyesters by the polycondensation of dicarboxylic acid and an aliphatic glycol using certain metal-containing polycondensation catalysts in conjunction with a stabilization composition formed as the reaction product of phosphoric acid, meta-phosphoric acid, superphosphoric acid or mixtures thereof and an aliphatic epoxide having between 2 and about 10 carbon atoms.

15 Claims, No Drawings

STABILIZATION OF POLYCONDENSATION CATALYSTS

DESCRIPTION

Field of the Invention

The present invention relates to a process for the stabilization of polyethylene terephthalates and to stabilizing compositions to be employed therein to protect such polyethylene terephthalates against thermal decomposition and, further, to provide for the preparation of high molecular weight, light colored polyethylene terephthalates by use of a titanium, zirconium, germanium and/or tin containing polycondensation catalysts.

BACKGROUND OF THE INVENTION

The production of polyesters and copolyesters of dicarboxylic acids and aliphatic glycols has been carried out commercially for decades. Among the earlier general disclosures relating to the production of polyesters and copolyesters is the disclosure in U.S. Pat. No. 2,465,319, issued Mar. 22, 1949. Since the disclosure in U.S. Pat. No. 2,465,319 many variations have been made in the processes employed to produce such polyesters and copolyesters and many catalysts for use in such processes have been disclosed in the patent and non-patent literature.

U.S. Pat. No. 3,546,179, discloses the use of certain compounds containing both silicon and phosphorus for use as polycondensation catalysts for the production of polyesters and copolyesters.

The use of metal halides and several silicon compounds as catalysts in the polycondensation of dicarboxylic acids and aliphatic glycols is disclosed in U.S. Pat. Nos. 4,143,057, 4,254,241, and Re. 30,554. The metal halide catalysts disclosed therein are employed with a solvent present. The use of a solvent is generally undesirable since the solvent may interfere with the polycondensation reaction or may actually need to be removed during the polycondensation reaction. In addition, these metal halides generally tend to be hydrolytically unstable and thus require careful handling during their use. Thus, although the catalysts disclosed in U.S. Pat. Nos. 4,143,057, 4,254,241 and Re. 30,554 are desirable catalysts it would be even more desirable to have a catalyst that may be used without the use of or with the use of a minimal amount of a solvent and, further, which has a greater degree of hydrolytic stability. Such a hydrolytically stable catalyst which may be employed without the use of solvent is disclosed in copending application U.S. Ser. No. 336,317, filed Dec. 31, 1981 and now U.S. Pat. No. 4,361,694, wherein an alkoxyhalotitanate is employed with a silicon and phosphorus containing compound as the catalyst for the polycondensation reaction.

Polyethylene terephthalates are generally prepared by esterifying a dicarboxylic acid, preferably pure terephthalic acid, or transesterifying the corresponding dimethyl ester of terephthalic acid with from 1.5 to 5, and preferably from 1.5 to 4 moles of a diol, such as ethylene glycol, relative to 1 each mole of the dicarboxylic acid component, in the presence of a transesterification catalyst respectively at between about 150° C. and about 250° C. (reaction step I) and subjecting the reaction products thereof to a polycondensation reaction in the presence of polycondensation catalyst(s) at a temperature preferably between about 200° C. and about 300° C., under reduced pressure, preferably less than about 1 millimeter mercury (Hg) (reaction step II).

It has been found that the selection of the polycondensation catalyst not only has a marked influence on the reaction rate of both transesterification and polycondensation reactions but, also, influences the side reactions, the heat stability, and color of the final polyester, i.e., polyethylene terephthalate products. As a result, there has been an intense interest in the development of transesterification and polycondensation catalysts in an effort to overcome the problems of color, thermal stability and toxicity found in many of such catalysts. For example, see R. E. Wilfong in Poly. Sci. 54, 385 (1961).

Among the more widely used metal-containing polycondensation catalysts are compounds of germanium, titanium, and antimony, employed separately or in combination. U.S. Pat. No. 2,578,660 describes the use of germanium and germanium dioxide as polycondensation catalysts. The use of antimony compounds, in combination with certain phosphorus compounds as stabilizers, is disclosed in U.S. Pat. No. 3,441,540 and in East German Pat. Nos. 30,903 and 45,278.

The use of titanium compounds, titanium tetraisopropylate or titanium tetrabutylate, are described as polycondensation catalysts for the preparation of polyesters in U.S. Pat. Nos. 2,727,881, 2,822,348 and 3,075,952 and British Pat. Nos. 775,316, 777,216, 793,222 and 852,061. In addition East German Pat. No. 45,278 discloses the use of titanium compounds in combination with a phosphorus-containing stabilizer. Unfortunately the phosphorus-containing stabilizer disclosed in East German Pat. No. 45278 does little to change yellow-brown discoloration which may occur in the polycondensation products when a titanium catalyst is employed. In addition when a titanium catalyst is employed to prepare a polyethylene terephthalate it is generally observed that if the reaction time is not kept short or if the catalyst concentration is not maintained at a sufficiently low level, generally, the polyester product fails to achieve the desired degree of polycondensation and that a commercially viable product, in terms of its color cannot be obtained without the use of a stabilizer for the titanium-containing polycondensation catalyst.

To accommodate the generally poor color characteristics of polyesters formed with metal-containing polycondensation catalysts it is desirable to add a stabilizer to the reaction mixture after the transesterification step and after addition of the polycondensation catalyst. It is believed that such a stabilizer inhibits undesirable side reactions without producing loss of desired catalyst activity. In addition, the stabilizer is expected to increase the thermal stability of the end polyester product and also improve the color characteristics thereof, i.e., whiteness of such products. A general description of inhibitors may be found at H. Ludewig, Polyesterfasern (polyester fibers), 2nd Edition Akademie-Verlag Berlin, 1974, in U.S. Pat. No. 3,028,366 and in German Offenlegungsschriften Nos. 1,644,977 and 1,544,986. Such disclosures have mentioned, generally, as stabilizing compositions such compounds as phosphoric acid, meta-phosphoric acid and phosphorous acid and their phenyl esters such as trinonylphenyl phosphate or triphenyl phosphate or triphenyl phosphite. The use of such triphenyl phosphate or triphenyl phosphite stabilization compositions results in polyester products having poor color characteristics and also results in the formation of phenyl byproducts, i.e., byproducts containing phenol or phenyl derived compounds, which may also be undesirable owing to their bactericidal effect on microorganisms in water treatment systems.

U.S. Pat. No. 3,028,366 discloses a process for polymerizing a glycol ester of terephthalic acid in the presence of a metal-containing catalyst, preferably antimony oxide relating to the improvement of producing a polymer substantially free from color by use of phosphoric acid, alkyl phosphates, hydroxyalkyl phosphates, and aryl phosphates in an amount less than 0.2 mol percent, based on the terephthalate content of the polymer. The patent employs antimony as the catalyst in the preferred embodiment. Examples 1 and 2 employ tetraisopropyltitanate as the metal-containing catalyst with example 2 employing tributyl phosphate as a modifier.

In general, it is not possible to obtain sufficiently high molecular weight, light colored polyethylene terephthalates by use of phosphoric acid esters as stabilization compositions, such as the triphenyl-derived stabilization compositions. Such has been recognized by the patent literature; see U.S. Pat. No. 4,115,371, column 2, lines 7 to 23. As a result, the use of triphenyl phosphoric acid derivatives as thermal and color stabilizer compositions has not heretofore been deemed commercially useful in the manufacture of polyethylene terephthalates.

U.S. Pat. No. 4,115,371 issued Sept. 19, 1978, discloses a process for the stabilization of a specific titanium-containing polycondensation catalyst, i.e., titanium tetrabutylate. The disclosed process employs only titanium tetrabutylate as the polycondensation catalyst and metaphosphoric acid or its alkali or alkaline earth metal salts. The patentee states that the selection of the catalyst is so "delicately balanced that use of titanium tetraisopropylate gives products which, although they are also of high molecular weight, are, however, slightly yellow colored." Example 3 employs titanium tetraisopropylate and sodium metaphosphate and discloses a yellow shade of 10.3. Although the patentee obtained products having b-values of 5.1, it is obvious that the patentee discloses a stabilizer with which only one specific titanium catalyst may be employed. In contrast, the stabilizer of the instant application may be employed with many different polycondensation catalysts.

DISCLOSURE OF INVENTION

This invention relates to process for the stabilization (both thermal and color) of polyethylene terephthalate against thermal decomposition and to the stabilization composition employed therein comprising a stabilization composition for use with a titanium-, zirconium-, germanium-, tin- (or mixtures thereof) containing polycondensation catalysts where the stabilization composition is formed as the reaction product of phosphoric acid, meta-phosphoric acid, super phosphoric acid, and/or polyphosphoric acid and an aliphatic epoxide, i.e. oxirane ring containing. The aliphatic epoxide is generally selected as an aliphatic epoxide, having between 2 and about 10 carbon atoms, preferably having between 2 and about 4 carbon atoms and most preferably the alkylene oxide is propylene oxide.

It has been found that by use of such a stabilization composition (formed from such a phosphoric acid and an epoxide) in conjunction with the metal-containing catalyst, that such a catalyst stabilizer system provides for the formation of polyethylene terephthalates which possess a high intrinsic viscosity, i.e., an intrinsic viscosity greater than about 0.6, and generally have a yellow shade of about 6 or below and preferably less than 5 (b-value measured with a crystalline product by the Gardner Scale).

DETAILED DESCRIPTION OF THE INVENTION

In the production of polyesters and copolyesters the reaction is generally considered a dual or two stage reaction. In the first stage esterification or transesterification occurs in one step (Step I) and in the second polycondensation stage occurs (Step II) as follows:

I. TRANSESTERIFICATION

FROM DIMETHYL TEREPHTHALATE (DMT):

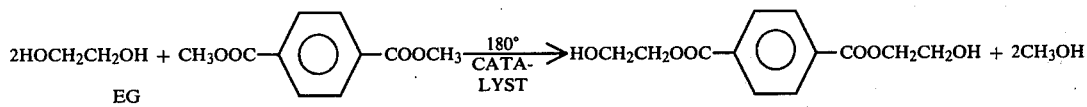

FROM TEREPHTHALIC ACID (TPA):

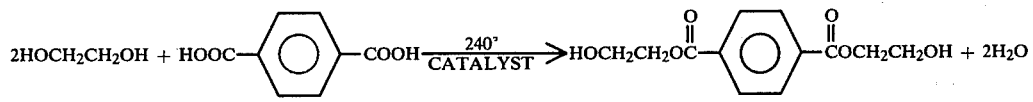

II. POLYCONDENSATION

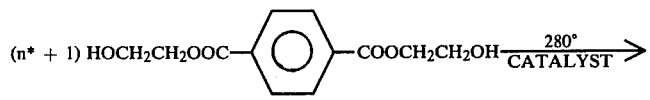

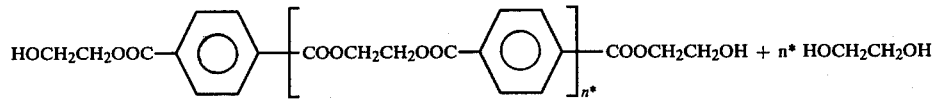

*n = about 90 to 100 in many instances.

The present invention relates to a process for producing polyesters using germanium-, zirconium-, tin- and/or titanium-containing catalysts in the polycondensation step (Step II) in conjunction with a stabilization composition formed from the reaction product of phosphoric acid, meta-phosphoric acid, super phosphoric acid and/or polyphosphoric acid with an aliphatic epoxide, i.e. an aliphatic alkylene epoxide. The stabilization compositions (hereinafter referred to as "stabilizer" or "stabilization composition") of this invention are formed by reacting (1) phosphoric acid, meta-phosphoric acid, superphosphoric acid and/or polyphosphoric acid with (2) an alkylene oxide, i.e., an aliphatic epoxide, such as ethylene oxide, propylene oxide, butylene oxide, etc. The molar ratio of (2) to (1) employed in the preparation of the stabilizer is between 2 and 20 and is preferably greater than 4 and less than about 10. The aliphatic epoxide employed herein is generally selected such that it contains between 2 and about 10 carbon atoms and preferably between 2 and about 4 carbon atoms and most preferably is 1,2-propylene oxide. Representative of such aliphatic epoxides which may be employed herein are ethylene oxide, 1,2-propylene oxide, 1,2-epoxy-3-iso-propoxy propane and 1,2-epoxy butane.

The polycondensation catayst employed herein with the stabilization composition of the present invention may comprise almost any germanium-, zirconium, tin-, and/or titanium-containing compound generally employable as a polycondensation catalyst. The polycondensation catalyst is preferably titanium-containing. It has been observed, although such has not been explained, that the stabilizer of the instant invention does not provide significant thermal and color stability when employed with an antimony catalyst.

Illustrative of suitable metal alkoxy halides which one can include within this general formula are the mono-, di-, and tri-alkoxy bromides, alkoxy chlorides, alkoxy fluorides and alkoxy iodides of titanium and zirconium; the mono-, di- and tri-alkoxy bromides, alkoxy chlorides, alkoxy fluorides and alkoxy iodides of germanium and tin, including the mixed bromide-chlorides, bromide-iodides, bromide-iodides and chloride-iodides of tin.

The preferred metal alkoxy halides are the haloalkoxytitanates. These metal halides are well known to the average chemist and are fully enumerated in chemical handbooks to the extent that specific naming thereof is not necessary herein to enable one skilled in the art to know chemical names of the specific metal alkoxyhalides per se; see the *The organic Chemistry of Titanium*, Feld and Cowe, Butterworth & Co., Ltd. (1965).

Although most titanium compounds having activity as a polycondensation catalyst may be employed herein as the polycondensation catalyst the following are representative of titanium-containing compounds employable herein: titanium tetrahalides, tetraalkoxy titanates, mixed halo and alkoxy substituted titanates, the alkoxyhalo titanates, and titanium beta-diketonates, such as titanium acetyl acetonate.

The stabilization compositions are particularly well suited for use with titanium-containing polycondensation catalysts such as those disclosed in U.S. Pat. No. 4,156,072, issued May 22, 1979, column 1, line 64 to column 4, line 54 of such disclosure being incorporated by reference herein. The titanium compounds disclosed in co-pending U.S. Ser. No. 336,317, and now U.S. Pat. No. 4,361,694, commonly assigned are in particular, advantageously employed in conjunction with the stabilization compositions of the instant invention. The titanium-containing polycondensation catalysts disclosed in U.S. Pat. No. 4,361,694 comprise a complex of a titanium compound and a silicon compound. The titanium compound has the general formula:

$$M(OR)_aX_b$$

wherein M is a metal and is at least one of titanium, zirconium, germanium and tin; R is alkyl, aryl, alkylaryl, arylalkyl, or haloalkyl having between 2 and about 20 carbon atoms, preferably having between 2 and about 4 carbon atoms; a is an integer having a value of from 1 to 3; the sum (a+b) is equal to or less than 4; and X is at least one of F, Cl, Br or I. Representative of silicon compounds that may used in conjunction with metal halides or metal alkoxyhalides to produce coordination complex catalysts employable in conjunction with the stabilization compositions of this invention as the metal containing polycondensation catalyst are represented by the following generic formulas:

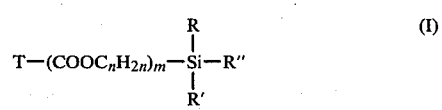 (I)

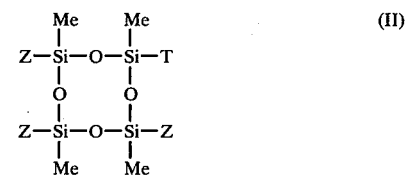 (II)

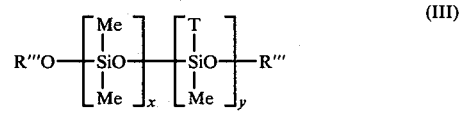 (III)

or

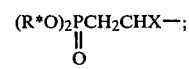 (IV)

wherein
T is $CH_2=CX-$ or $$(R^*O)_2\overset{\overset{\displaystyle O}{\|}}{P}CH_2CHX-;$$

X is hydrogen or methyl and is methyl only when m is one;
R* is alkyl or haloalkyl having from 1 to 4 carbon atoms;
R** is is methyl, ethyl, butyl, acetoxy, methoxy, ethoxy or butoxy;
R is methyl, ethyl, butyl, methoxy, ethoxy, butoxy, or trimethylsiloxy;
R' is methyl, methoxy, ethoxy, butoxy, or trimethylsiloxy;
R" is methoxy, ethoxy, butoxy, trimethylsiloxy or vinyldimethylsiloxy;
R'" is methyl, ethyl, butyl or trimethylsilyl;
Me is methyl;
Z is methyl or T;
Q is an $NH_2CH_2-$, $NH_2CH_2NHCH_2-$,NC,—'HS— or $HSCH_2CH_2S-$ group;
n is an integer having a value of from 2 to 5;
m is an integer having a value of zero or one;
x is an integer having a value of from 1 to 100; and
y is an integer having a value of from 1 to 100.

Subgeneric to the silicon compounds represented by formula (I) are the compounds represented by the following subgeneric formulas:

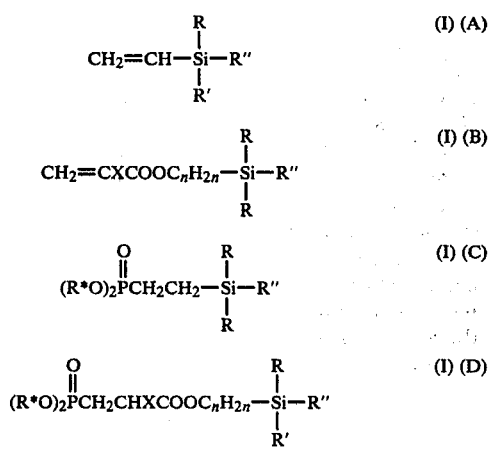

Subgeneric to the silicon compounds represented by formula (II) are the compounds represented by the following subgeneric formulas:

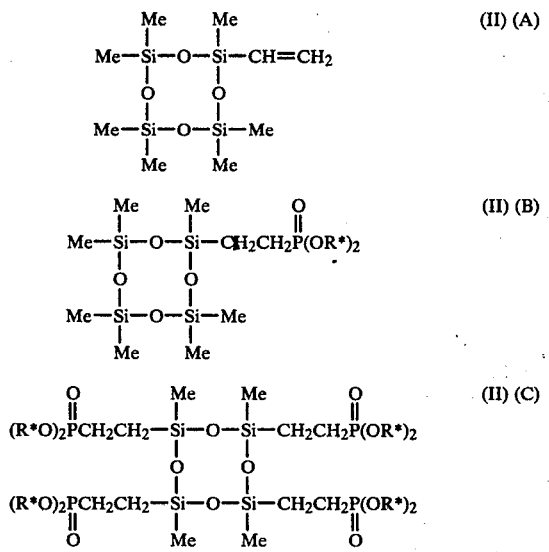

Illustrative of the silicon compounds which may be employed in forming the titanium-containing catalyst of the invention are the following: beta-cyanoethyl triethoxysilane, gamma-mercaptopropyl triethoxysilane, gamma-aminopropyl triethoxysilane, diethoxyphosphorylethyl methyl diethoxysilane, vinyl triethoxysilane, vinyl trimethoxysilane, vinyl triacetoxysilane, gamma-methacryloxypropyl trimethoxysilane, diethoxyphosphorylethyl heptamethyl cyclotetrasiloxane, trimethyl silyl terminated copolymer having dimethylsiloxy and methylvinylsiloxy units in the molecule, beta-cyanethyl trimethylsilane, gamma-(2-aminopropyl)triethoxysilane, S-beta(2-mercaptoethyl)mercaptoethyl triethoxysilane, beta-mercaptoethyl triethoxysilane, vinyl methyl diethoxysilane, vinyl methyl di(trimethylsiloxy)silane, tetramethyl divinyl disiloxane, heptamethyl vinyl cyclotetrasiloxane, 1,3,5,7-tetramethyl 1,3,5,7-tetravinyl cyclotetrasiloxane, diethoxyphosphorylethyl methyl diethoxysilane, diethoxyphosphorylisopropyl triethoxylsilane, diethoxyphosphorylethyl methyl di(trimethylsiloxy)-silane, heptamethyl diethoxyphosphorylethyl cyclotetrasiloxane, 1,3,5,7-tetramethyl 1,3,5,7,-tetra(diethoxyphosphorylethyl)cyclotetrasiloxane, 1,1,3,3-tetramethyl-1,3-di(ethoxyphosphorylethyl)-disiloxane.

The instant process is distinctive in that it employs in the polycondensation step a polycondensation catalyst-stabilizer system which comprises a titanium-, zirconium-, germanium-, tin-containing catalyst or mixtures of such and a stabilizer composition formed as the reaction product of phosphoric acid, meta-phosphoric acid, superphosphoric acid, polyphosphoric acid and mixtures thereof. In addition, any compound which may form the catalyst and/or stabilizer in situ may be employed herein. For example, any compound which forms phosphoric acid and aliphatic epoxide in situ may be employed to form the stabilizer of this invention. The polycondensation catalyst-stabilizer system is provided in a sequential manner with the polycondensation catalyst being first present in the polycondensation mixture of dicarboxylic acid, e.g., dimethyl terephthalate, and diol, e.g., ethylene glycol, with subsequent addition of the stabilizer composition during the polycondensation reaction (Step II). The stabilizer composition is preferably added to the dicarboxylic acid/aliphatic glycol system when the pressure of the system is at about 5 millimeters of mercury or below. It has been observed that the unique color and thermal stabilization effect of the stabilizer composition is not present when such stabilizer is employed with the antimony polycondensation catalyst.

In a typical polyester reaction, the prescribed amounts of dicarboxylic acid compounds, diols and catalysts (for Steps I and II) are charged to the reactor. The reaction mixture is then heated under an inert gas atmosphere at a temperature typically between about 190° C. and about 230° C. to effect the initial esterification, i.e., transesterification. Thereafter, a substantial amount of the glycol is removed and the transesterification is completed by heating the reaction mixture, generally at a temperature of from about 220° C. to about 235° C. The second stage, i.e., the polycondensation reaction, is generally then carried out by heating the reaction mixture at a temperature of from about 225° C. to about 325° C. under a reduced pressure of between about 0.1 mm. and about 20 mm. of mercury, preferably below about 1 mm. The use of the stabilization compositions of this invention occurs during the second stage polycondensation reaction to provide a polycondensation product with improved thermal stability and improved color characteristics as compared to products formed with titanium-, zirconium-, germanium- and tin-containing polycondensation catalyst which are employed without the use of the stabilization composition of this invention.

EXPERIMENTAL PROCEDURE

The following examples were carried out by preparing a stabilization composition, as hereinafter described, and employing such in the preparation of a polyester product. The titanium-containing compounds employed herein were formed from a mixture of tetraalkyl titanate and an acetyl halide (acetyl-chloride or acetyl bromide were employed), by charging the acetyl halide and the titanium-containing compound into a reaction flask (a standard three neck round bottom flask) equipped with a mechanical stirrer, condenser and a dropping funnel. The acetyl halide was slowly added to the titanate. This mixture was refluxed between about 2 to 2½ hours in an oil bath at a temperature between about 70° C. and 80° C. The resulting mixture was distilled under vacuum with fractions being analyzed as set forth in the following examples.

The resulting titanium compound, above formed, was then reacted with a silicon compound, as hereinbefore described and as set forth in the examples. The resulting complex, i.e., the titanium-containing polycondensation complex catalyst, was analyzed by microanalysis.

The polycondensation catalyst was then employed in the production of a polyethylene terephthalate by mixing said catalyst with dimethyl terephthalate, ethylene glycol, and manganese acetate. Typically the transesterification and polycondensation reactions were carried out using about 737 grams (3.8 moles) of dimethyl terephthalate, about 542 grams (8.74 mole) of ethylene glycol, about 0.222 grams of manganese acetate (as the transesterification catalyst) and 0.07 grams of a titanium-containing complex catalyst (generally introduced in 50 milliliters of warm ethylene glycol). The transesterification reaction was carried out by heating the mixture in an oil bath to between about 178° C. to about 190° C. for a period of time (about 3 hours) under an argon atmosphere with methanol being distilled from the reaction mixture. The temperature was then raised to between about 220° C. and about 240° C. and maintained at that temperature for about one hour to complete the transesterification step. The temperature of the mixture was then raised to between about 260° C. to about 280° C. and the pressure was reduced to below about 1 millimeter (mm) of mercury and the polycondensation process was carried out. During the polycondensation reaction the mixture was stirred with a mechanical stirrer (agitator) at a rate of about 120 rotations per minute. An amount of the stabilizer composition of this invention was added when the mixture was at a temperature of about 250° C. and at a pressure of about 5 millimeters of mercury or less. After about fifty percent (by volume) of the ethylene glycol was removed from the mixture the stabilizer was added in an amount of about 0.325 grams by means of a microdish or by means of a syringe. The polycondensation reaction was continued with the pressure being reduced to less than about 0.1 millimeter of mercury. The polycondensation reaction was generally terminated when the intrinsic viscosity of the mixture was about 0.6, a typical value for a commercially acceptable polyester, and the time required to obtain this intrinsic viscosity was recorded as the polycondensation time (the time from reaching 1 mm mercury pressure at 280° C. to when the polyester has an intrinsic viscosity of about 0.6) which time was generally between about 2 and about 2.5 hours. The intrinsic viscosity determinations were made by preparing a solution of 0.5 weight percent of polyester in o-chlorophenol and measuring its viscosity at 25° C. in an Ubbelohde viscometer.

The whiteness of the polyester was measured by use of a Hunterlab Tristimulus (x,y,z) Colorimeter D-25 which uses filters that approximate spectrally the standard observer functions of the eye and measure color in terms of the Hunterlab Tristimulus (x,y,z) Colorimeter. The b-value is an indication of the yellowness or whiteness of the polyester and is determined by the equation:

$$b = \frac{7.0 (y - 0.847z)}{\sqrt{y}}$$

The lower the value of b the less yellow is the polyester. The measurement of b is made using a 2 inch square block of polyester resin after the polyester resin has been polished. A positive b value indicates that some yellow exists while a negative b value indicates some blue exists.

PREPARATION OF STABILIZATION COMPOSITIONS

The stabilization compositions employed in the following examples were prepared as set forth hereinafter. The stabilization compositions of this invention are identified as stabilizers A,B,C,D, E and F simply for convenient reference.

STABILIZER A

The following reagents were employed to prepare Stabilizer A:
57 grams (0.0648 mole) of ethyl acetate
54.9 grams of superphosphoric acid (105%)
18.0 grams (0.170 mole) of diethylene glycol
330 grams (5.68 mole) of propylene oxide The superphosphoric acid was added to a three-neck round bottom flask equipped with a mechanical stirrer and a condenser. Ethyl acetate and diethylene glycol were than added. Subsequently, this reaction mixture was cooled to about 20° C. and the propylene oxide slowly added to the reaction mixture under an argon atmosphere while stirring and with cooling, in an ice bath maintained between about 20° C. and about 40° C. The addition of the propylene oxide was completed in about 2 hours.

The reaction mixture was then refluxed for about 2 hours at 44° C. and excess propylene oxide stripped in vacuo to give 265 grams of the stabilizer product. The stabilizer had a phosphorous content of 6.26 percent by weight, and the infrared spectrum showed strong bands at 3400, 1737, 1455, 1375 and 1260 cm$^{-1}$. A duplicate preparation showed a phosphorus content of 6.85 percent by weight.

STABILIZER B

The following reagents were employed to prepare Stabilizer B:
57 grams (0.0648 mole) of ethyl acetate
54.9 grams superphosphoric acid (105%)
18 grams (0.170 mole) diethylene glycol
388.8 grams (5.4 mole) of 1,2-epoxybutane A mixture of superphosphoric acid and ethyl acetate was prepared in a three-neck round bottom flask equipped with a mechanical stirrer and a condenser. Diethylene glycol was then added to the mixture to give a turbid mixture. 1,2-epoxybutane was then gradually added to the mixture. The reaction was observed to be slightly exothermic. The resulting mixture was then refluxed at a temperature of about 63° C. for a period of about 2.5 hours. Excess 1,2-epoxybutane was then stripped from the mixture in vacuo to give 262 grams of a colorless stabilizer product.

STABILIZER C

The following reagents were employed to prepare Stabilizer C.

5.7 grams ethyl acetate
5.5 grams superphosphoric acid (105%)
1.8 grams of diethylene glycol
63 grams (0.54 mole) of 1,2-epoxy-3-propoxypropane The superphosphoric acid was added to a three-neck round bottom flask equipped with a condenser and a mechanical stirrer and ethyl acetate and diethylene glycol were then added. The reaction mixture was cooled in an ice bath, while the 1,2 epoxy-3-propoxy-propane was added over a period of about 45 minutes. The resulting reaction mixture was then refluxed at a temperature of about 70° C. for a period of about 2 hours. Excess 1,2-epoxy-3-propoxypropane was then stripped in vacuo from the reaction mixture to give 37.2 grams of the stabilizer product.

STABILIZER D

The following reagents were employed to prepare Stabilizer D:
5.7 grams of ethyl acetate
5.5 grams of superphosphoric acid (105%)
1.8 grams of diethylene glycol
72 grams of 1,2-epoxy-3-(2'-methyl-propoxy)propane The 1,2-epoxy-3-(2'-methylpropoxy)propane was gradually added to the mixture of superphosphoric acid, ethyl acetate and diethylene with the observed reaction being slightly exothermic. The resulting reaction mixture was then refluxed at a temperature of about 75° C. for a period of about 2 hours. Excess 1,2-epoxy-3-(2'-methylpropoxy) propane was stripped in vacuo until a constant weight was observed. The stabilizer product weighed 45.6 grams.

STABILIZER E

The following reagents were employed to prepare Stabilizer E:
5.7 grams of ethyl acetate
5.5 grams superphosphoric acid (105%)
1.8 grams of diethylene glycol
63 grams of 1,2-epoxy-3-isopropoxypropane The superphosphoric acid, ethyl acetate and diethylene glycol were mixed in a three-neck round bottom flask while the mixture was mechanically stirred. The 1,2-epoxy-3-isopropoxypropane was gradually added with an exothermic reaction being observed. The reaction mixture was cooled in an ice bath such that the temperature was maintained at about 20° C. to 40° C. The reaction mixture was then heated at a temperature of about 70° C. to 80° C. for a period of about 2 hours. Excess 1,2-epoxy-3-isopropoxypropane was stripped in vacuo until a constant weight was observed. The stabilizer product weighed 37.6 grams.

COMPARATIVE STABILIZER F

Stabilizer F was prepared in a manner similar to that employed to prepare Stabilizer E, except that instead of employing 1,2-epoxy-3-isopropoxypropane the alkylene oxide was the aromatic alkylene oxide 1-2-epoxyethyl benzene. The stabilizer product weighed 59 grams.

EXAMPLES 1-7

The above prepared stabilizers (A-F) were employed to prepare poly(ethylene terephthalate) using as the polycondensation catalyst a titanium-containing catalyst prepared from dichloro di(isopropoxy) titanate and dimethoxyphosphoryl ethyl diethoxysilane. The above described procedure for the preparation of poly(ethylene terephthalate) was employed. The intrinsic viscosity and the b value (yellow shade) are given in Table I. Example 1 is a comparative example wherein no stabilizer composition according to this invention was employed. Example 7 is a comparative example wherein an aromatic epoxide was employed to prepare the compound employed as the stabilizer (comparative stabilizer F).

TABLE I

| EXAMPLE | STA-BILIZER | QUAN-TITY* | INTRINSIC VISCOSITY | b-VALUE* |
|---|---|---|---|---|
| 1 | — | 0.0 | 0.59 | 13.23 |
| 2 | A | 0.40 | 0.55 | 5.57 |
| 3 | B | 0.32 | 0.53 | 3.09 |
| 4 | C | 0.65 | 0.53 | 5.23 |
| 5 | D | 0.70 | 0.48 | 3.75 |
| 6 | E | 0.65 | 0.50 | 4.77 |
| 7** | F | 0.60 | 0.55 | 9.95 |

*the quantity (in grams) of stabilizer employed is not necessarily the optimum quantity to produce the lowest b-value product.
**Comparative example employing 1,2-epoxyethyl benzene, an aromatic epoxide, which appears to be only slightly useful as a stabilizer composition.

EXAMPLE 8

A stabilizer, according to to this invention was prepared according to the procedure employed for Stabilizer A for use in examples 8 to 13 by charging 57 grams (0.0648 mole) of ethyl acetate (solvent), 54.9 grams of superphosphoric acid (105%), 18.0 grams (0.170 mole) of diethylene glycol and 330 (5.4 mole) of propylene oxide into a 3-neck round bottom flask equipped with a mechanical stirrer and a condenser. The superphosphoric acid was added first with ethyl acetate and diethylene glycol then being added. The reaction mixture was cooled to about 20° C. and the propylene oxide was added dropwise under an argon atmosphere while the reaction mixture was stirred and cooled by an ice bath. The temperature of the reaction mixture was kept at between about 20° C. and about 40° C. during the addition of the propylene oxide which took about two hours.

The reaction mixture was refluxed for two hours at about 44° C.: and subsequently stripped in vacuo of excess propylene oxide to give 265 grams of the stabilizer product having 6.26 weight percent phosphorus and characterized by an infrared spectrum having strong bands at 3400 cm$^{-1}$, 1737 cm$^{-1}$, 1455 cm$^{-1}$, 1375 cm$^{-1}$, and 1260 cm$^{-1}$.

The coordination complex component of the titanium-containing catalyst, i.e., monochloro tri(isopropoxy) titanate, was produced by preparing a mixture of 65.0 grams of tetra isopropyl titanate and 18.0 grams of acetyl chloride in a reaction flask (a standard three-neck round bottom flask) equipped with a mechanical stirrer, condenser and dropping funnel. The acetyl chloride was slowly added to the tetra isopropyl titanate. The mixture was refluxed for 2½ hours in an oil bath at a temperature between about 70° C. and 80° C. and then distilled in vacuo. Microanalysis of the fraction distilling at about 135° C. to 140° C. (18 mm Hg) showed 40.19 wt. percent carbon; 8.13 wt. percent hydrogen; and 14.19 wt. percent chlorine.

The above product (26.3 grams) was mixed with 34.0 grams of di(isopropoxy) phosphoryl ethyl methyl diethoxysilane. An exothermic reaction occurred and a yellow solution resulted.

The resulting catalyst was used in the preparation of a polyester, as above described, and produced a polyester having a molecular weight of 17,800 and a b value of 7.4.

EXAMPLE 9

A stabilizer according to this invention was prepared according to the procedure for Stabilizer A for use in examples 8 to 13 by charging 57 grams (0.0648 mole) of ethyl acetate (solvent), 54.9 grams of superphosphoric acid (105%), 18.0 grams (0.170 mole) of diethylene glycol and 330 (5.68 mole) of propylene oxide into a 3-neck round bottom flask equipped with a mechanical stirrer and a condenser. The superphosphoric acid was added first with ethyl acetate and diethylene glycol then being added. The reaction mixture was cooled to about 20° C. and the propylene oxide was added dropwise under an argon atmosphere while the reaction mixture was stirred and cooled by an ice bath. The temperature of the reaction mixture was kept at between about 20° C. and 40° C. during the addition of the propylene oxide which took about two hours.

The reaction mixture was refluxed for two hours at about 44° C.: and subsequently stripped in vacuo of excess propylene oxide to give 265 grams of the stabilizer product having 6.26 weight percent phosphorus and characterized by an infrared spectrum having strong bands at 3400 cm$^{-1}$, 1737 cm$^{-1}$, 1455 cm$^{-1}$, 1375 cm$^{-1}$, and 1260$^{-1}$ cm.

The coordination complex component of the titanium-containing catalyst, i.e., monobromo tri(isopropoxy) titanate, was produced by preparing a mixture of 65.0 grams of tetra isopropyl titanate and 18.0 grams of acetyl chloride in a reaction flask (a standard three-neck round bottom flask) equipped with a mechanical stirrer, condenser and dropping funnel. The acetyl chloride was slowly added to the tetra isopropyl titanate to prepare the mixture. The mixture was refluxed for 2½ hours in an oil bath at a temperature between about 70° C. and 80° C. and then distilled in vacuo. Microanalysis of the fraction distilling at about 135° C. to 140° C. (18 mm Hg) showed 40.19 wt. percent carbon; 8.13 wt. percent hydrogen; and 14.19 wt. percent chlorine.

The above product (26.3 grams) was mixed with 34.0 grams of di(isopropoxy) phosphoryl ethyl methyl diethoxysilane. An exothermic reaction occurred and a yellow solution resulted.

The resulting catalyst was used in the preparation of a polyester, as above described, and produced a polyester having a molecular weight of 17,410 and a b value of 5.99.

EXAMPLE 10

The coordination complex component monobromo tri(isopropoxy) titanate was produced by preparing a solution of 34.8 grams (0.122 mole) of tetra isopropyl titanate and 14.8 grams (0.122 mole) of acetyl chloride in a reaction flask (a standard 3-neck round bottom flask) equipped with a mechanical stirrer, condenser and dropping funnel. The acetyl chloride was slowly added to the tetra isopropyl titanate to prepare the solution. The mixture was refluxed for 2½ hours in an oil bath at about 70° C. to 80° C. and then distilled in vacuo.

Microanalysis of the fraction collected at 70° C. to 80° C. and at a pressure of 0.5 millimeter of mercury showed 34.15 wt. percent carbon; 6.74 wt. percent hydrogen; and 27.53 wt. percent bromine.

The above fraction was mixed with an equal molar amount of di(isopropoxy) phosphoryl ethyl methyl diethoxysilane. An exothermic reaction occurred and a yellow oil solution was observed.

The polycondensation catalyst was used to produce a white polyester as above described having a molecular weight of about 17,410 and a b value of 5.9.

EXAMPLE 11

The coordination complex component dichloro di(isopropoxy) titanate was produced by preparing a solution of 521 grams (2.0 mole) of monochloro tri(isopropoxy) titanate according to the procedure of Example 1. To this mixture was added 157 grams (2.0 mole) of acetyl chloride in a reaction flask (a standard three-neck round bottom flask) equipped with a mechanical stirrer, condenser and dropping funnel. The acetyl chloride was slowly added to the monochloro tri(isopropoxy) titanate to prepare the solution. The mixture was re-fluxed for 2 hours in an oil bath at 70° to 80° C. Microanalysis of the product fraction collected at 95°–98° C. and 1.0 millimeter of mercury showed: 30.34 wt. percent carbon; 6.30 wt. percent hydrogen; and 24.48 wt. percent chlorine.

The above product, 0.8 moles (189.0 grams) of dichloro di(isopropoxy) titanate, was added to 261 grams (0.8 mole) of di(isopropoxy) phosphoryl ethyl methyl diethoxysilane. A exothermic reaction occurred and an orange oil solution was observed.

The resulting catalyst was used to produce a polyester which had a molecular weight of about 17,000 and a b value of 4.3.

EXAMPLE 12

A polycondensation catalyst was prepared according to the invention by mixing equimolar amounts of dichlorodi-(isopropoxy) titanate and di(methoxy) phosphoryl Erlenmeyer diethoxysilane in an erlenmeyer flask. The product was yellow oil.

The resulting catalyst was used to prepare a polyester which had a molecular weight of 19,450 and a b value of 3.9.

EXAMPLE 13

A polycondensation catalyst was prepared according to the invention by mixing equimolar amounts of monochloro tributoxy titanate and di(methoxy) phosphoryl ethylmethyl diethoxysilane in an erlenmeyer flask. The product was yellow oil.

The resulting catalyst was used to prepare a polyester which had a molecular weight of 24,500 and a b value of 6.5.

EXAMPLE 14

The coordination complex component monobromo tri(butoxy) titanate was produced by preparing a mixture of 85 grams (0.25 mole) of tetrabutyl titanate and 30.74 grams (0.25 mole) of acetyl bromide in a reaction flask (a standard three-neck round bottom flask) equipped with a mechanical stirrer, condenser and dropping funnel. The acetyl bromide was slowly added to the tetra butyl titanate to prepare the mixture. The mixture was refluxed for 2½ hours in an oil bath and at about 70° C. to 80° C. and subsequently distilled in vacuo. Microanalysis of the fraction collected at a temperature of 142°–152° C. and a pressure of 0.35 millimeters of mercury showed: 41.38 wt. percent carbon; 8.02 wt. percent hydrogen; 22.20 wt. percent bromine.

The product fraction, above, was mixed with an equal molar amount of di(methoxy) phosphoryl ethyl methyl diethoxysilane. A exothermic reaction occurred and a yellow oil solution was observed.

The resulting catalyst was used in conjunction with the stabilizer in the preparation of a polyester which has a molecular weight of 20,274 and a b-value of 5.1.

EXAMPLE 15

The coordination complex component trichloro butoxy titanate was produced by preparing a mixture of 95.0 grams (0.5 mole) of titanium tetrachloride and 37.0 grams (0.5 mole) of butanol in a reaction flask (a standard 250 milliter three-neck round bottom flask) equipped with a mechanical stirrer, condenser and dropping funnel. The titanium tetrachloride was slowly added to the butanol. An ice bath was used to maintain the reaction temperature under control owing to the exothermic nature of the reaction. A yellow solution was observed which upon standing produced a white crystalline product. Microanalysis of the product after washing with hexane and drying in vacuo showed: 21.77 wt. percent carbon; 4.62 wt. percent hydrogen; 45.30 wt. percent chlorine.

A portion of the above product (1.17 grams; 0.00515 mole) was mixed with an equal molar amount of di(isopropoxy) phosphoryl ethyl methyl diethoxysilane (1.678 grams; 0.00525 mole). A yellow oil was observed as the product.

The resulting catalyst was used in the preparation of a polyester in conjunction with the stabilizer prepared in Example 8 and gave a polyester having a molecular weight of 19,450 and a b value of 3.4.

We claim:

1. A polycondensation catalyst/stabilizer composition for the preparation of a high molecular weight light colored polyethylene terephthalate comprising (1) a metal containing polycondensation catalyst wherein the metal is selected from the group consisting of titanium, zirconium, germanium, tin and mixtures thereof compound and (2) a stabilization composition which is the reaction product of phosphoric acid, metaphosphoric acid, superphosphoric acid, polyphosphoric acid or mixtures thereof and an aliphatic epoxide having between 2 and about 10 carbon atoms.

2. The catalyst/stabilizer composition of claim 1 wherein the aliphatic epoxide contains between 2 and about 4 carbon atoms.

3. The catalyst/stabilizer composition of claim 2 wherein the aliphatic epoxide is ethylene oxide.

4. The catalyst/stabilizer composition of claim 2 wherein the aliphatic epoxide is propylene oxide.

5. The catalyst stabilizer composition of claim 1 wherein the metal containing polycondensation catalyst is a coordination complex of (A) and (B), wherein:

(A) is a metal alkoxyl halide selected from the group consisting of

$M(OR)_aX_b$ wherein M is at least one of titanium zirconium, germanium and tin; R is alkyl, aryl, alkylaryl, arylalkyl and haloalkyl having between 2 to 20 carbon atoms; a and b are integers having a value of from 1 to 3; the sum of (a+b) is equal to or less than the integer 4; X is at least one of F, Cl, Br or I;

(B) is a silicon compound selected from the group consisting of:

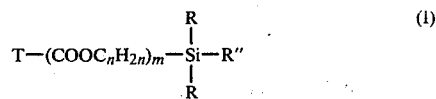

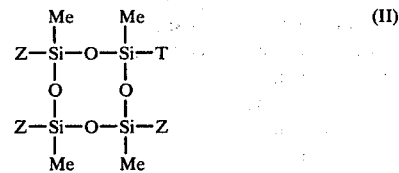

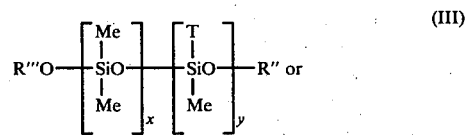

wherein
T is $CH_2=CX—$ or

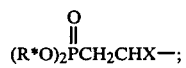

X is hydrogen or methyl and is methyl only when m is one;

R* is alkyl or haloalkyl having from 1 to 4 carbon atoms;

R** is methyl, ethyl, butyl acetoxy, methoxy, ethoxy, or butoxy;

R is methyl, ethyl, butyl, methoxy, ethoxy, butoxy, or trimethylsiloxy;

R' is methyl, methoxy, ethoxy, butoxy or trimethylsiloxy;

R" is methoxy, ethoxy, butoxy, trimethylsiloxy or vinyl dimethylsiloxy;

R'" is methyl, ethyl, butyl, or trimethyl-silyl;

Me is methyl;

Z is methyl or T;

Q is an $NH_2CH_2—$, $NH_2CH_2 NHCH_2—$, $NC—$, $HS—$ or $HSCH_2CH_2S—$ group;

n is an integer having a value of from 2 to 5;

m is an integer having a value of zero or one;

x is an integer having a value of from 1 to 100; and y is an integer having a value of from 1 to 100;

wherein the mole ratio of A:B in said coordination complex is between about 2:1 and about 1:10.

6. A catalyst/stabilizer composition as claimed in claim 5, wherein said polycondensation catalyst is a coordination complex of monobromo tri(isopropoxy) titanate and di(isopropoxy) phosphoryl ethyl methyl diethoxysilane.

7. A catalyst/stabilizer composition as claimed in claim 5, wherein said polycondensation catalyst is a coordination complex of monochloro tri(isopropoxy) titanate and di(isopropoxy)phosphoryl ethyl methyl diethoxysilane.

8. A catalyst/stabilizer composition as claimed in claim 5, wherein said polycondensation catalyst is a coordination complex of dichloro(diisopropyl)-titanate and di(ispropoxy)phosphoryl ethyl methyl diethoxysilane.

9. A catalyst/stabilizer composition as claimed in claim 5, wherein said polycondensation catalyst is a coordination complex of monochloro tri(butoxy) titanate and di(methoxy)phosphoryl ethyl methyl diethoxysilane.

10. A catalyst/stabilizer composition as claimed in claim 5, wherein said polycondensation catalyst is a coordination complex of monobromo tri(butoxy) titanate and di(methoxy)phosphoryl ethyl methyl diethoxy silane.

11. A catalyst/stabilizer composition as claimed in claim 5, wherein said condensation catalyst is a coordination complex of dichloro dipropoxy titanate and di(iso-propoxy)phosphoryl ethyl methyl diethoxysilane.

12. A catalyst/stabilizer composition as claimed in claim 5, wherein said polycondensation catalyst is a coordination complex of trichloro butoxy titanate and di(isopropoxy) phosphoryl-ethyl methyl di(ethoxysilane).

13. A catalyst/stabilizer composition as claimed in claim 5 wherein said polycondensation catalysts is a coordination complex of dichloro di(isopropoxy) titanate and di(methoxy) phosphoryl ethyl methyl diethoxy silane.

14. The catalyst/stabilizer composition of claim 5 wherein the aliphatic epoxide contains between 2 and about 4 carbon atoms.

15. The catalyst/stabilizer composition of claim 14 wherein the aliphatic epoxide is 1,2-propylene oxide.

* * * * *